(12) United States Patent
Kato

(10) Patent No.: US 11,374,301 B2
(45) Date of Patent: Jun. 28, 2022

(54) CABLE TYPE ANTENNA

(71) Applicant: Murata Manufacturing Co., Ltd., Nagaokakyo (JP)

(72) Inventor: Noboru Kato, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 491 days.

(21) Appl. No.: 16/366,299

(22) Filed: Mar. 27, 2019

(65) Prior Publication Data
US 2019/0221914 A1 Jul. 18, 2019

Related U.S. Application Data

(63) Continuation of application No. PCT/JP2018/030687, filed on Aug. 20, 2018.

(30) Foreign Application Priority Data

Sep. 21, 2017 (WO) .................. PCT/JP2017/034123
Oct. 18, 2017 (JP) .............................. JP2017-201991

(51) Int. Cl.
*H01Q 1/22* (2006.01)
*H01Q 1/24* (2006.01)
(Continued)

(52) U.S. Cl.
CPC ............. *H01Q 1/2208* (2013.01); *G06K 7/10* (2013.01); *G06K 19/07773* (2013.01);
(Continued)

(58) Field of Classification Search
CPC ...... H01Q 1/2208; H01Q 11/02; H01Q 11/12; H01Q 9/30; H01Q 1/24; G06K 7/10; G06K 19/07773; G06K 7/10316; H04B 5/00
See application file for complete search history.

(56) References Cited

U.S. PATENT DOCUMENTS 8,384,499 B2 2/2013 Suzuki et al.
9,899,715 B2 2/2018 Yosui et al.
(Continued)

FOREIGN PATENT DOCUMENTS

CA 2963899 A1 4/2016
JP 2007104413 A 4/2007
(Continued)

OTHER PUBLICATIONS

International Search Report issued in PCT/JP2017/034123, dated Nov. 21, 2017.
(Continued)

*Primary Examiner* — Hai V Tran
*Assistant Examiner* — Michael M Bouizza
(74) *Attorney, Agent, or Firm* — ArentFox Schiff LLP

(57) ABSTRACT

A cable type antenna is provided having a small-sized lightweight configuration and enabling specifying of a radiation region having a desired antenna length. The cable type antenna may be sectionalized into a first region on the power feeding circuit side and a second region on the leading end side. The cable type antenna of the present disclosure further comprises a balanced-to-unbalanced transformer element disposed between the first region and the second region, wherein the balanced-to-unbalanced transformer element includes an unbalanced-side terminal connected to the first region and a balanced-side terminal connected to the second region configured to allow the first region to serve as a non-radiation part and the second region to serve as a radiation part.

18 Claims, 11 Drawing Sheets

(51) Int. Cl.
   *H01Q 11/12* (2006.01)
   *H01Q 9/30* (2006.01)
   *G06K 7/10* (2006.01)
   *H04B 5/00* (2006.01)
   *G06K 19/077* (2006.01)
   *H01Q 11/02* (2006.01)

(52) U.S. Cl.
   CPC .............. *H01Q 1/24* (2013.01); *H01Q 9/30* (2013.01); *H01Q 11/02* (2013.01); *H01Q 11/12* (2013.01); *H04B 5/00* (2013.01)

(56) References Cited

U.S. PATENT DOCUMENTS

| | | |
|---|---|---|
| 9,905,931 B2 | 2/2018 | Kilian |
| 10,116,025 B2 | 10/2018 | Yosui et al. |
| 2007/0075911 A1 | 4/2007 | Yaginuma et al. |
| 2010/0194500 A1 | 8/2010 | Suzuki et al. |
| 2014/0291397 A1* | 10/2014 | Caputo ............... H01Q 1/2216 235/385 |
| 2015/0109103 A1 | 4/2015 | Shimura et al. |
| 2015/0242666 A1* | 8/2015 | Ramsch ............... H01Q 1/2216 235/439 |
| 2016/0197408 A1 | 7/2016 | Kilian |
| 2016/0372811 A1 | 12/2016 | Yosui et al. |
| 2017/0161531 A1* | 6/2017 | Komaki ............... H01Q 13/203 |
| 2018/0025591 A1* | 1/2018 | Takano ............... H01Q 1/2216 705/23 |
| 2018/0145384 A1 | 5/2018 | Yosui et al. |
| 2018/0241433 A1* | 8/2018 | Kilian .................. H01Q 11/16 |
| 2019/0199001 A1* | 6/2019 | Kato ...................... H01Q 1/24 |

FOREIGN PATENT DOCUMENTS

| | | |
|---|---|---|
| JP | 2008228527 A | 9/2008 |
| JP | 2010183361 A | 8/2010 |
| JP | 2012028968 A | 2/2012 |
| JP | 2013214909 A | 10/2013 |
| JP | 2014140012 A | 7/2014 |
| JP | 2016533692 A | 10/2016 |
| WO | 2015146448 A1 | 10/2015 |
| WO | 2018101104 A1 | 6/2018 |

OTHER PUBLICATIONS

Written Opinion of the International Searching Authority issued in PCT/JP2017/034123, dated Nov. 21, 2017.

International Search Report issued in PCT/JP2018/030687, dated Oct. 30, 2018.

Written Opinion of the International Search Authority issued in PCT/JP2018/030687, dated Oct. 30, 2018.

* cited by examiner

CABLE TYPE ANTENNA

CROSS REFERENCE TO RELATED APPLICATIONS

The present application is a continuation of PCT/JP2018/030687 filed Aug. 20, 2018, which claims priority to Japanese Patent Application No. 2017-201991, filed Oct. 18, 2017, which further claims priority to PCT/JP2017/034123 filed on Sep. 21, 2017, the entire contents of each of which are incorporated herein by reference.

TECHNICAL FIELD

The present disclosure relates to a cable type antenna used for short-range communication.

BACKGROUND

Conventional cable type antennas include a coaxial cable type antenna. In a configuration proposed for the coaxial cable type antenna, a surface wave attenuation device is disposed to adjust an antenna length (communication region) for transmission/reception, for example, as described in Patent Document 1 (identified below).

Patent Document 1: Japanese Unexamined Patent Application Publication (Translation of PCT Application) No. 2016-533692.

A surface wave attenuation device in the cable type antenna disclosed in Patent Document 1 is made up of a plurality of ferrite rings and is disposed in a predetermined region on an outer circumferential surface of a coaxial cable to define an antenna length. The surface wave attenuation device has a function of attenuating a traveling wave flowing through an outer conductor of the coaxial cable at the time of transmission by the cable type antenna and sectionalizes the coaxial cable into a radiation portion functioning as an antenna and a signal transmission portion through which transmission/reception Since the surface wave attenuation device in the cable type antenna described above is configured to attenuate the traveling wave flowing through the outer conductor of the coaxial cable by using the plurality of ferrite rings, this configuration turns the traveling wave into Joule heat due to a magnetic loss of ferrite, which causes a loss of communication energy, and therefore has a problem in terms of efficient communication. Moreover, since the plurality of ferrite rings constituting the surface wave attenuation device is disposed at a predetermined interval on the coaxial cable serving as a signal transmission line, a certain length (size) is required on the coaxial cable as a region for disposing the surface wave attenuation device. Particularly, to prevent the traveling wave of the radiation portion from leaking to the signal transmission portion, which should be a non-radiation portion, ferrite must be disposed in large amount along the signal transmission line of the coaxial cable. As a result, the surface wave attenuation device itself is increased in size and weight, and therefore, the conventional cable type antenna has a significant problem in terms of reductions in size and weight.

Furthermore, although the surface wave attenuation device is disposed for specifying a radiation portion having a desired antenna length, the device is configured such that the traveling wave is gradually attenuated by the plurality of ferrite rings attached in series, the substantial length of the antenna length cannot accurately be defined. Therefore, the device has a problem that the radiation characteristics of the antenna cannot be optimized through design by setting the antenna length to a predetermined length.

SUMMARY OF THE INVENTION

An object of the present disclosure is to provide a cable type antenna having a small-sized lightweight configuration and enabling specifying of a radiation region having a desired antenna length.

In exemplary aspects, a cable type antenna is provided according to the present disclosure, in which the cable type antenna includes a first conductor including one end connected to a power feeding circuit and the other end serving as a leading end portion, wherein the cable type antenna is sectionalized into a first region on the power feeding circuit side and a second region on the leading end side, a second conductor disposed along the first conductor a matching circuit disposed between the leading end portion of the first conductor and a leading end portion of the second conductor, and a balanced-to-unbalanced transformer element disposed between the first region and the second region, and wherein the balanced-to-unbalanced transformer element includes an unbalanced-side terminal connected to the first region and a balanced-side terminal connected to the second region configured to allow the first region to serve as a non-radiation part and the second region to serve as a radiation part.

According to exemplary embodiments described in the present disclosure, a cable type antenna having a small-sized lightweight configuration and enabling specifying of a radiation region having a desired antenna length is provided.

DETAILED DESCRIPTION

Figure 1:
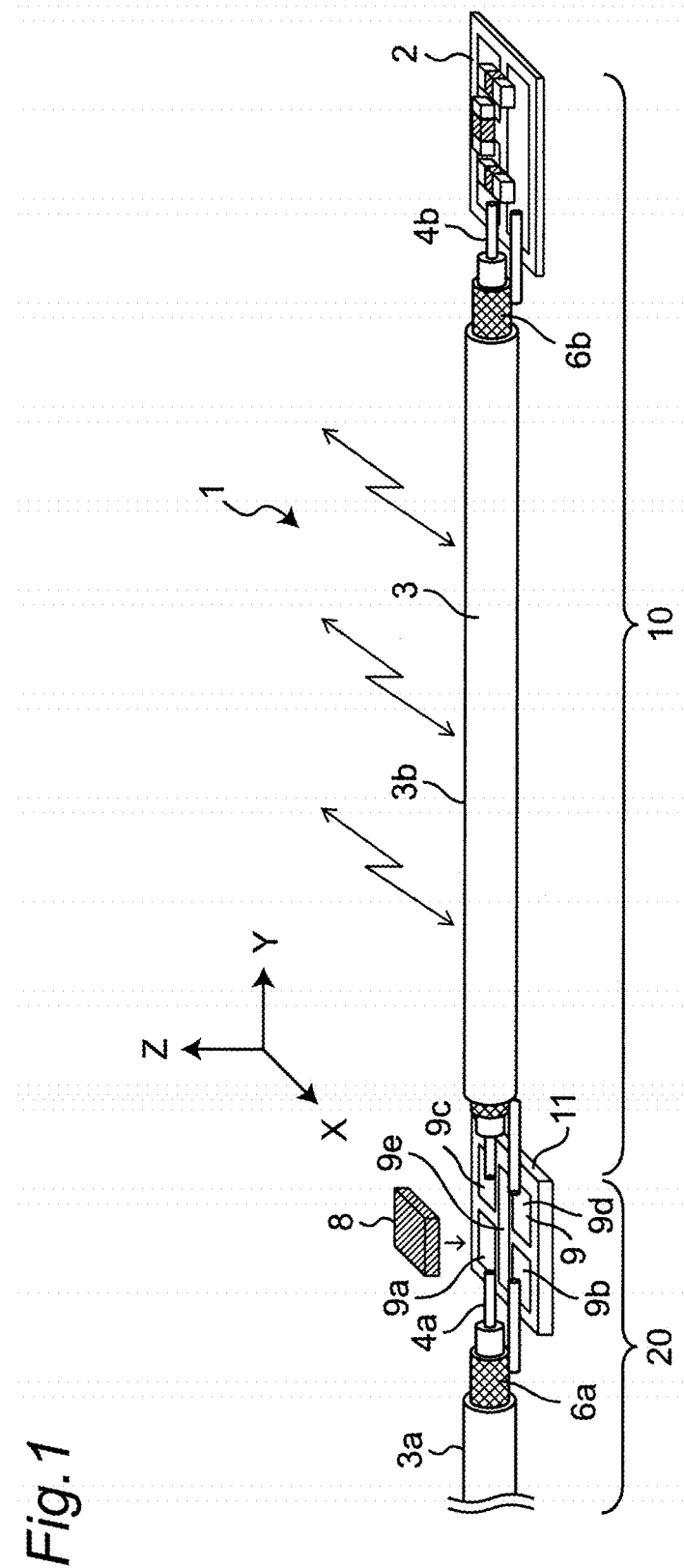
FIG. 1 is a perspective view schematically showing a configuration of a cable type antenna of a first embodiment according to the present disclosure.

In exemplary aspects, the present disclosure provides a cable type antenna of a first aspect that includes a first conductor including one end connected to a power feeding circuit and the other end serving as a leading end portion, wherein the cable type antenna is sectionalized into a first region on the power feeding circuit side and a second region on the leading end side, a second conductor disposed along the first conductor, a matching circuit disposed between the leading end portion of the first conductor and a leading end portion of the second conductor, and a balanced-to-unbalanced transformer element disposed between the first region and the second region, wherein the balanced-to-unbalanced transformer element includes an unbalanced-side terminal connected to the first region and a balanced-side terminal connected to the second region configured to allow the first region to serve as a non-radiation part and the second region to serve as a radiation part.

In the cable type antenna of the first aspect configured as described above, a radiation region having a desired antenna length can be specified.

In the cable type antenna of a second aspect according to the present disclosure, the balanced-to-unbalanced transformer element may be disposed at a position where the antenna length in the second region is an integral multiple of ½ of a wavelength of a resonance frequency in the first aspect.

In the cable type antenna of a third aspect according to the present disclosure, the balanced-to-unbalanced transformer element may be disposed at a position where the antenna length of the second region is an even multiple of ½ of a wavelength of a resonance frequency in the first aspect.

In the cable type antenna of a fourth aspect according to the present disclosure, the matching circuit may be configured to match impedances of the first conductor and the second conductor in the second region and to form the resonance frequency of the second region in any one of the first to third aspects.

In the cable type antenna of a fifth aspect according to the present disclosure, the cable type antenna may be made up of a coaxial cable including an inner conductor as the first conductor and an outer conductor as the second conductor in any one of the first to fourth aspects.

In the cable type antenna of a sixth aspect according to the present disclosure, a cable matching circuit for matching the impedance of the first region and the impedance of the second region may be disposed between the first region and the second region in the fifth aspect.

In the cable type antenna of a seventh aspect according to the present disclosure, the balanced-to-unbalanced transformer element may be configured as a winding transformer type, a merchant type, or a lumped parameter type in any one of the first to sixth aspects.

Embodiments of the cable type antenna according to the present disclosure will now be described with reference to the accompanying drawings. The following embodiments will be described by using a configuration of a coaxial cable type antenna as an example of the cable type antenna; however, the cable type antenna of the present disclosure is not limited to the coaxial cable type antenna and is applicable to an antenna of a high-frequency transmission line using a stripline or a microstrip line, for example.

In the accompanying drawings, members having substantially the same function and configuration are denoted by the same reference numeral and may not be described in the description. To facilitate understanding, the accompanying drawings are schematic representations mainly showing respective constituent elements. As used herein, the phrase "electrically connected" includes not only mutual direct connection, but also the case of connection via electrostatic capacity and the case of connection by electromagnetic field coupling.

All the exemplary embodiments described below show specific examples of the present disclosure, and the present disclosure is not limited to these configurations. Numerical values, shapes, configurations, etc. specifically described in the following embodiments are merely examples and do not limit the present disclosure. Among the constituent elements in the following embodiments, constituent elements not described in the independent claim describing the highest concept are described as arbitrary constituent elements. In all the embodiments, the same applies to configurations in respective modifications, and the configurations described in the modifications may be combined with each other.

First Embodiment

In a first exemplary embodiment according to the present disclosure, a coaxial cable type antenna using a 50Ω coaxial cable will be described as the cable type antenna. FIG. 1 is a perspective view schematically showing a configuration of a coaxial cable type antenna 1 of the first embodiment. FIG. 1 shows an X axis, a Y axis, and a Z axis orthogonal to each other for convenience, and a width direction (X direction), a longitudinal direction (Y direction), a thickness direction (Z direction) in the coaxial cable type antenna 1 of the first embodiment will be described by using the X axis, the Y axis, and the Z axis.

In the coaxial cable type antenna 1 shown in FIG. 1, for example, a power feeding circuit (not shown) such as a reader device and a reader/writer device is connected to one end side (the left end side of FIG. 1) of the coaxial cable type antenna 1, and the other end is a leading end portion that is a termination of a lead-out end. A radiation part 10 having a predetermined antenna length is formed on the leading end side (the right end side of FIG. 1) of the coaxial cable type antenna 1. An RFID system used in this case is a UHF band RFID system using the 900 MHz band, for example, and the coaxial cable type antenna 1 functions as an antenna for a UHF band reader/writer device for communicating with an RFID tag, for example.

Figure 2:
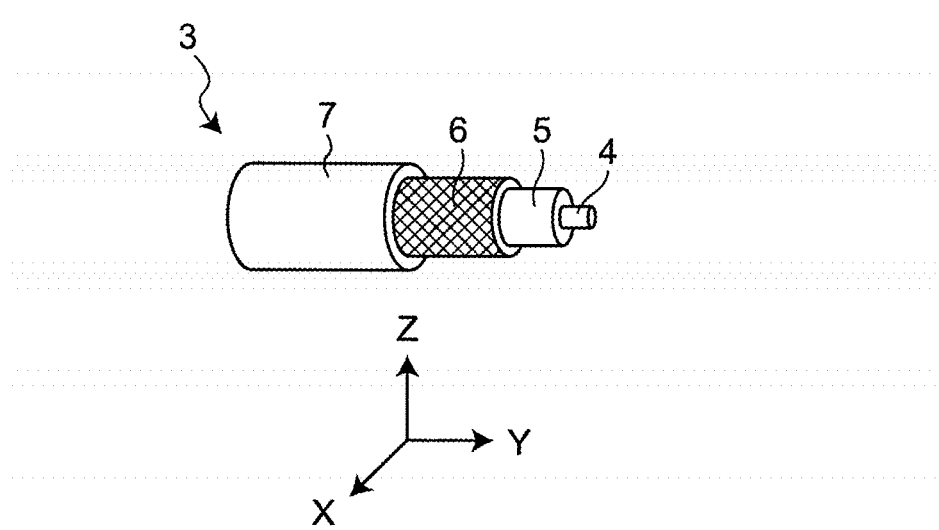
FIG. 2 is a view showing an example of a configuration of a cable in the cable type antenna of the first embodiment.

FIG. 2 is a view showing a configuration of a coaxial cable 3 used in the coaxial cable type antenna 1 of the first embodiment. As shown in FIG. 2, the coaxial cable 3 is a communication cable having a circular cross section and has an inner conductor 4 as a first conductor at the center extending in the longitudinal direction (Y-axis direction). In the coaxial cable 3, for example, an insulator 5 made of an insulating material such as foamed polyethylene and TEF-LON is disposed around the inner conductor 4 serving as the first conductor, and an outer conductor 6 serving as a second conductor made of braided wire is disposed as a netlike outer cover conductor on the outer circumference of the insulator 5. The outer conductor 6 serving as the second conductor is covered with a sheath 7 that is an outer cover for protecting the coaxial cable 3. Flame-retardant polyethylene etc. are used as a material of the sheath 7. The configuration of the coaxial cable 3 and the materials of the insulator 5 and the sheath 7 are merely examples, and the present disclosure is not limited to these configurations.

The coaxial cable type antenna 1 of the first embodiment includes a signal transmission-side cable 3*a* serving as a signal transmission line (non-radiation part 20) and a radiation-side cable 3*b* serving as a radiation part 10. The signal transmission-side cable 3*a* and the radiation-side cable 3*b* have the configuration of the coaxial cable 3 shown in FIG. 2. The radiation-side cable 3*b* is the leading end side of the coaxial cable type antenna 1, and a matching circuit 2 is disposed at a leading end portion of the radiation-side cable 3*b*. The matching circuit 2 matches an impedance of an inner conductor 4*b* with an impedance of an outer conductor 6*b* in the radiation-side cable 3*b*.

Figure 3:
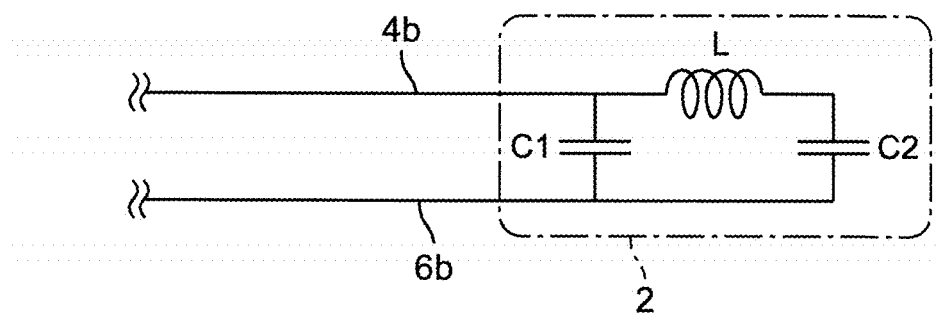
FIG. 3 is an equivalent circuit diagram showing a matching circuit in the cable type antenna of the first embodiment.
Figure 4:
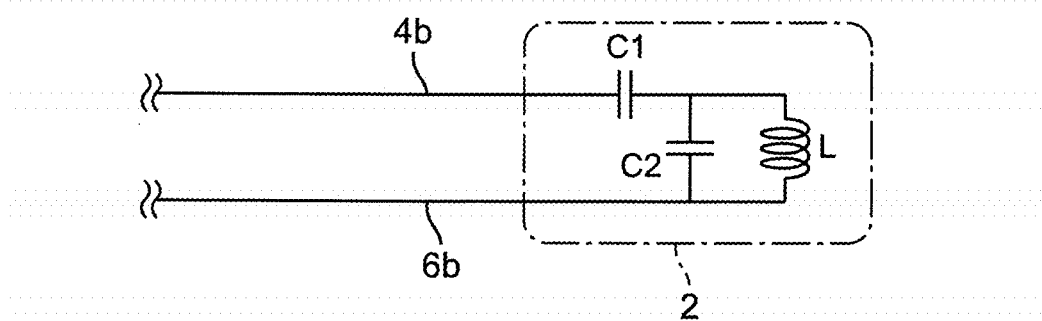
FIG. 4 is an equivalent circuit diagram showing another matching circuit in the cable type antenna of the first embodiment.

FIG. 3 is a diagram showing an equivalent circuit of the matching circuit 2. As shown in FIG. 3, the matching circuit 2 is made up of capacitances C1, C2 and an inductance L. For the configuration of the matching circuit 2, a configuration of an equivalent circuit shown in FIG. 4 can also be used. The coaxial cable type antenna 1 of the first embodiment is set to a predetermined resonance frequency (e.g., 900 MHz). The matching circuit 2 is configured to match the impedances of a first conductor (the inner conductor 4*b*) and a second conductor (the outer conductor 6*b*) in a second region (the radiation-side cable 3*b*) and to form the resonance frequency of the second region.

In the matching circuit 2, a high frequency signal is supplied from the inner conductor 4*b* of the radiation-side cable 3*b*, and the leading end side serves as the supply end side, so that a high frequency current flows through the outer conductor 6*b* in the radiation-side cable 3*b*. As a result, the radiation-side cable 3*b* is configured to function as the radiation part 10, illustrated in FIG. 1.

As shown in FIG. 1, the coaxial cable type antenna 1 of the first embodiment has a balun 8 that is a small-sized lightweight balanced-to-unbalanced transformer element disposed as a radiation region setting part between the radiation-side cable 3*b* serving as the radiation part 10 and the signal transmission-side cable 3*a* serving as the non-radiation part 20. The balun 8 is a surface mount type device, and five electrodes (not shown) disposed on a bottom surface of the balun 8 (not shown) are respectively connected to five balun connection electrodes 9 (9*a*, 9*b*, 9*c*, 9*d*, 9*e*) disposed on a balun board 11.

Although the coaxial cable type antenna 1 of the first embodiment is described in terms of a configuration provided with the balun 8 that is a balanced-to-unbalanced transformer element, a configuration other than a balun constituting a balanced-to-unbalanced transformer circuit may be used as the balanced-to-unbalanced transformer element.

Figure 5:
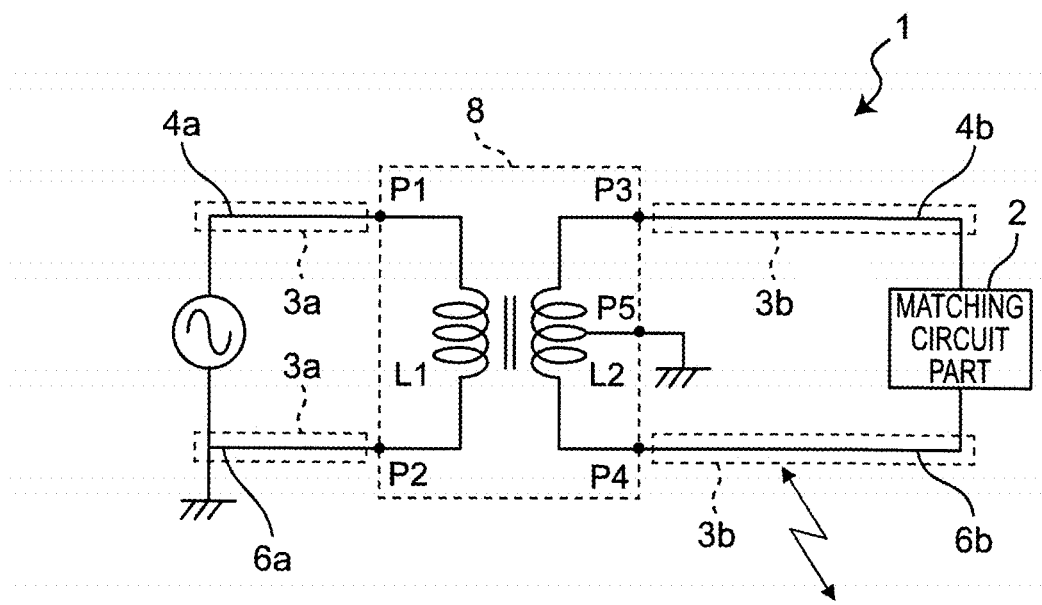
FIG. 5 is an equivalent circuit diagram of a balun of the cable type antenna of the first embodiment.

FIG. 5 is a diagram showing an equivalent circuit of the balun 8. As shown in FIG. 5, the balun 8 in the first embodiment has a configuration of a winding transformer type and includes a primary-side coil L1 and a secondary-side coil L2. The balun 8 is provided with input/output terminals P1 and P2 connected to the primary-side coil L1, input/output terminals P3 and P4 connected to the secondary-side coil L2, and a ground terminal P5 for grounding an intermediate position of the secondary-side coil L2. The input/output terminals P1 and P2 of the primary-side coil L1 are connected to the inner conductor 4*a* and the outer conductor 6*a*, respectively, of the signal transmission-side cable 3*a* and are connected to a power feeding circuit (not shown) via the signal transmission-side cable 3*a*. On the other hand, the input/output terminals P3 and P4 of the secondary-side coil L2 are respectively connected to the high-side (hot-side) line (the inner conductor 4*b*) and the low-side (cold-side) line (the outer conductor 6*b*) of the radiation-side cable 3*b* and are connected to the matching circuit 2 disposed on the antenna leading end side. In this case, the input/output terminals P1 and P2 of the primary-side coil L1 are unbalanced-side terminals, and the input/output terminals P3 and P4 of the secondary-side coil L2 are balanced-side terminals.

The inner conductor 4*b* and the outer conductor 6*b* of the radiation-side cable 3*b* and the inner conductor 4*a* and the outer conductor 6*a* of the signal transmission-side cable 3*a* electrically connected to the balun connection electrodes 9 disposed on the balun board 11 are respectively connected via coaxial cable connectors. In the connection between the matching circuit 2 and the radiation-side cable 3*b*, the inner conductor 4*b* and the outer conductor 6*b* are connected via a coaxial cable connector. However, in FIG. 1, a state of connection by the coaxial cable connectors is not shown, and mutual direct connection is shown in a simplified manner.

The coaxial cable type antenna 1 of the first embodiment configured as described above includes the balun 8 having the function of the radiation region setting part, and a first region on the power feeding circuit side relative to the balun 8 is defined as the non-radiation part 20. On the other hand, a second region from the leading end portion of the radiation-side cable 3*b* to the balun 8 is defined as the radiation part 10. By disposing the balun 8 as the radiation region setting part between the first region and the second region in this way, signals are prevented from leaking from a power feeding point of the balun 8 to the first region, i.e., the power feeding circuit side where the signal transmission-side cable 3*a* is disposed, so that the first region serves as the non-radiation part 20 shown in FIG. 1.

Since the balun 8, disposed as the radiation region setting part between the first region and the second region, is configured to separate signals flowing through the radiation part 10 and the non-radiation part 20 in the circuit configuration, a boundary may clearly be specified between the radiation part 10 and the non-radiation part 20. Therefore, an antenna length (defined as an antenna line in the radiation part 10) is easily set to a length that is an integral multiple, preferably an even multiple, of ½ of a wavelength (λ) of a resonance frequency in this configuration. The resonance frequency used in this case is a frequency in the UHF band, for example. By setting the antenna length in the second region to an integral multiple, preferably an even multiple, of λ/2, this configuration produces stable communication characteristics in the second region (the radiation part 10). As a result, the coaxial cable type antenna 1 of the first embodiment has a configuration with highly-efficient and highly-reliable communication characteristics. Particularly, by setting the antenna length in the second region to an even multiple of $\lambda/2$, signals flowing through the second region have at least one wavelength ($\lambda$) or a wavelength that is a multiple thereof (n$\lambda$; n is an arbitrary integer), this configuration exhibits particularly stable communication characteristics. Additionally, by appropriately selecting a desired position in the coaxial cable 3 for the position at which the balun 8 is disposed, the radiation part 10 can be set to a desired length.

In exemplary aspects, the coaxial cable type antenna 1 of the first embodiment has a configuration in which the balun 8 is disposed in the middle of the cable to suppress or prevent leakage from the radiation region side to the power feeding circuit side and to allow the radiation part 10 (more strictly speaking, the outer conductor 6b) to radiate a high frequency signal. Therefore, the coaxial cable type antenna 1 can significantly suppress a loss of the high frequency signal as compared to the conventional configuration in which the high frequency signal is attenuated by using a magnetic member (ferrite rings). Additionally, as compared to the configuration using the magnetic member as the radiation region setting part, the small-sized lightweight balun 8 is used, so that the radiation region setting part can be reduced in size and weight. Furthermore, by disposing the balun 8 as the radiation region setting part, the electrical length of the radiation part 10 can clearly be specified, and therefore, the antenna length (the electrical length of the antenna line) in the radiation part 10 can easily be set to an integral multiple, preferably an even multiple, of ½ of the wavelength ($\lambda$) of the resonance frequency. As described above, the cable type antenna 1 according to the first embodiment is a highly-reliable antenna device having a configuration easy to design and exhibiting stable communication characteristics with less reflection loss.

Second Embodiment

Figure 6:
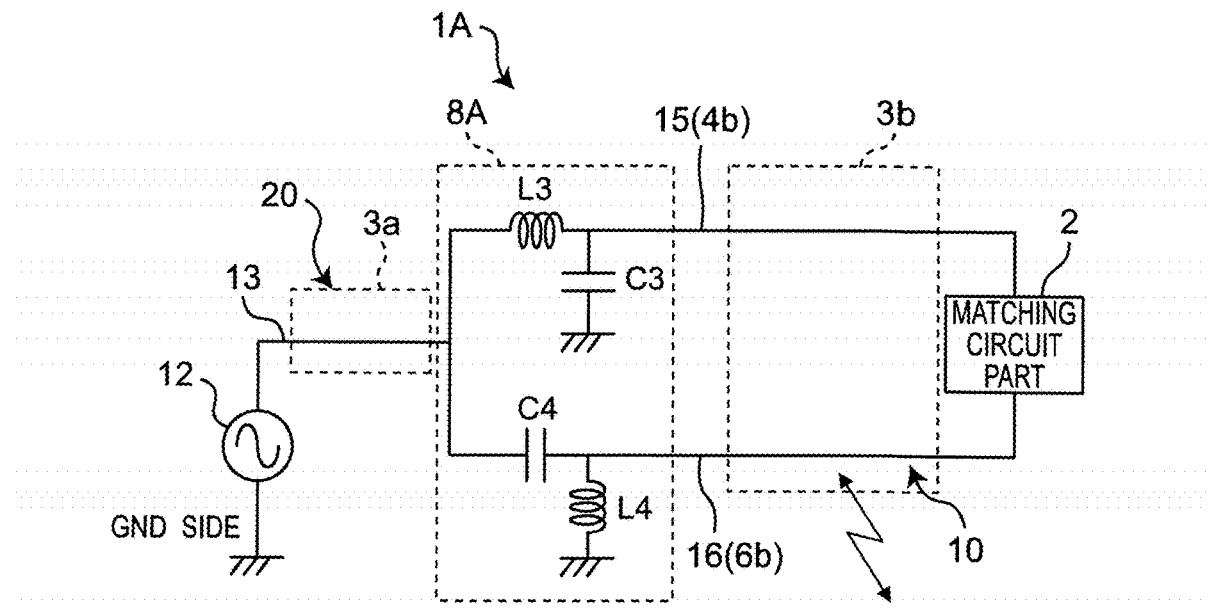
FIG. 6 is an equivalent circuit diagram of a balun in a cable type antenna of a second embodiment according to the present disclosure.

A coaxial cable type antenna 1A will be described as a cable type antenna of a second embodiment according to the present disclosure with reference to the accompanying figure, FIG. 6. In FIG. 6, elements having substantially the same functions and configurations as the first embodiment described above are denoted by the same reference numerals. The basic configuration and operation as the antenna in the second embodiment are the same as the first embodiment, so that points different from the first embodiment will mainly be described in the second embodiment.

As with the coaxial cable type antenna 1 of the first embodiment described above, the coaxial cable type antenna 1A of the second embodiment has a configuration in which a balun 8A serving as a balanced-to-unbalanced transformer element is disposed as the radiation region setting part. FIG. 6 is an equivalent circuit diagram showing a configuration of the balun 8A in the coaxial cable type antenna 1A of the second embodiment. The balun 8A is configured to serve as the radiation region setting part in the coaxial cable type antenna 1A of the second embodiment. In an exemplary aspect, the balun 8A can be a lumped parameter type balun configured by using lumped parameters (L, C).

Elements of the lumped parameter type balun 8A in the second embodiment may be configured for a surface mount type device as described in the first embodiment or have a configuration in which inductors and capacitors are formed by conductor patterns.

As shown in FIG. 6, the balun 8A in the second embodiment has an inductor L3 connecting a signal transmission line 13 of the signal transmission-side cable 3a from a power feeding circuit 12 and a high-side (hot-side) line 15 of the radiation-side cable 3b (antenna line), a capacitor C3 having one end connected to the high-side (hot-side) line side of the inductor L3 and the other end grounded, a capacitor C4 connecting the signal transmission line 13 from the power feeding circuit 12 and a low-side (cold-side) line 16 of the antenna line, and an inductor L4 having one end connected to the low-side (cold-side) line side of the capacitor C4 and the other end grounded. The high-side (hot-side) line 15 in the antenna line is the inner conductor 4b of the radiation-side cable 3b. The low-side (cold-side) line 16 in the antenna line is the outer conductor 6b of the radiation-side cable 3b. In the case of the balun 8A in the second embodiment, the signal transmission-side cable 3a is connected to an unbalanced-side terminal, and the radiation-side cable 3b is connected to a balanced-side terminal.

Since the lumped parameter type balun 8A configured as described above is disposed in the coaxial cable type antenna 1A, a phase of a current flowing through the high-side (hot-side) line 15 in the antenna line is delayed by 90 degrees (−90°), and a phase of a current flowing through the low-side (cold-side) line 16 is advanced by 90 degrees (+90°) in this configuration. As a result, there is a 180 degrees phase difference between the current flowing through the high-side (hot-side) line 15 and the current flowing through the low-side (cold-side) line 16, so that the current signals substantially cancel each other at the power feeding point in the balun 8A, and a leakage signal from the balun 8A to the power feeding circuit side is blocked. As a result, by disposing the balun 8A as the radiation region setting part between the first region and the second region of the coaxial cable 3, the first region and the second region are defined as the non-radiation part 20 and the radiation part 10, respectively, so that the radiation part 10 and the non-radiation part 20 can clearly be defined in this configuration.

The coaxial cable type antenna 1A of the second embodiment configured as described above has highly-efficient communication characteristics since the reflection loss is significantly suppressed. Furthermore, since the radiation part 10 can clearly be defined by the balun 8A, the electrical length of the low-side (cold-side) line from the position provided with the balun 8A serving as the radiation part 10 in the antenna line can be set to an integral multiple, preferably an even multiple, of $\lambda/2$ in this configuration. Therefore, the coaxial cable type antenna 1A of the second embodiment is an antenna device having stable communication characteristics with standing waves generated in the radiation part 10 in the antenna line.

The configuration of the balun 8A serving as the radiation region setting part is not limited to the configuration shown in FIG. 6 and may be any configuration in which the currents flowing through the high-side (hot-side) line 15 and the low-side (cold-side) line 16 in the antenna line have substantially opposite phases and in which the radiation part 10 and the non-radiation part 20 are defined.

In the configuration in which the balun 8A is disposed as the radiation region setting part, a cable matching circuit 17 may be disposed for matching impedances between the signal transmission line 13 (the signal transmission-side cable 3a) on the power feeding circuit 12 side and the antenna line (the radiation-side cable 3b) on the matching circuit 2 side.

Figure 7:
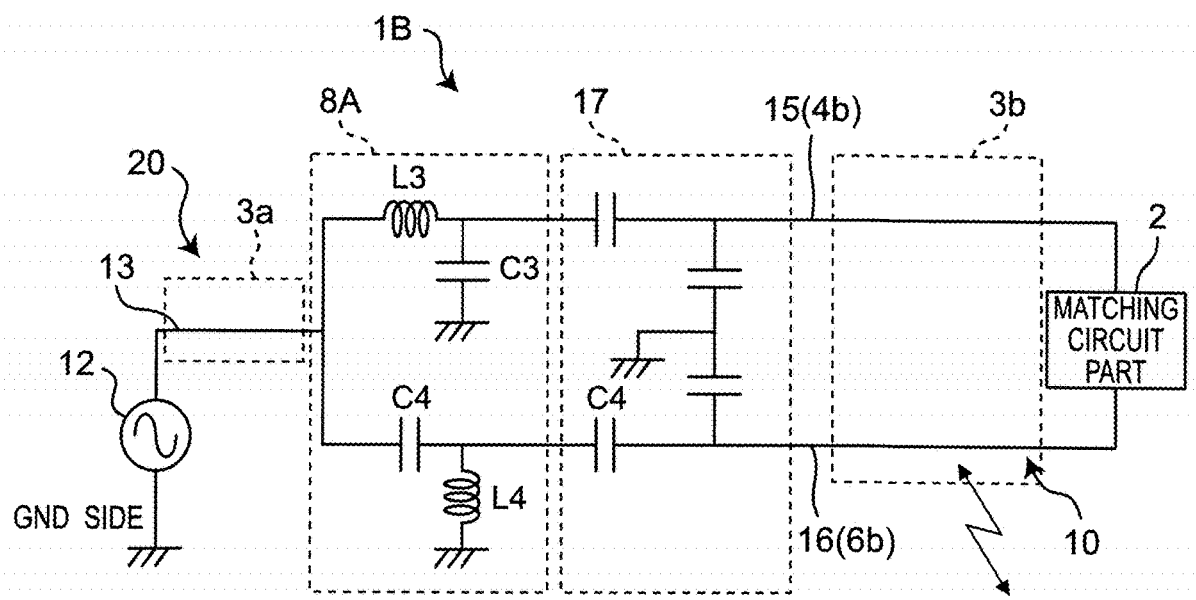
FIG. 7 is an equivalent circuit diagram of a balun in a modification of the cable type antenna of the second embodiment.

FIG. 7 is an example of a configuration in which the cable matching circuit 17 is disposed together with the balun 8A and is an equivalent circuit diagram showing a coaxial cable type antenna 1B that is a modification of the second embodiment. As shown in FIG. 7, the cable matching circuit 17 has a configuration in which a plurality of capacitors is disposed in the high-side (hot-side) line 15 and the low-side (cold-side) line 16 in the antenna line to match the impedances between the signal line 13 on the power feeding circuit 12 side and the antenna line on the matching circuit 2 side.

While the coaxial cable type antennas 1A, 1B (shown in FIG. 6 and FIG. 7) of the second embodiment have a configuration in which the balun 8A is disposed to block the leakage signal from the balun 8A to the power feeding circuit 12 side that is the first region, a magnetic member, for example, ferrite, may be disposed as a magnetic member in addition to the balun 8A in the signal transmission line 13 on the power feeding circuit 12 side of the balun 8A to more reliably block the leakage signal to the power feeding circuit 12 side. By disposing the magnetic member in this way, even when a signal leaks to the signal transmission line 13, the leakage signal is attenuated to reliably block the leakage signal to the signal transmission line 13 on the power feeding circuit 12 side in this configuration. The configuration with the magnetic member disposed in the signal line on the power feeding circuit side of the balun in this way can be applied to the configurations of the other embodiments in which the balun is disposed, so as to more reliably block the leakage signal to the signal transmission line 13.

In the coaxial cable type antennas 1A, 1B of the second embodiment, the radiation part 10 and the non-radiation part 20 can be defined by disposing the balun 8A as the radiation region setting part in these aspects. Additionally, as compared to the configuration in which the leakage signal is attenuated by using a magnetic member for specifying the radiation part 10, the coaxial cable type antennas 1A, 1B of the second embodiment have a configuration in which the balun 8A is disposed to prevent leakage to the power feeding circuit side so that the signal is substantially reflected by the radiation part 10. Therefore, the coaxial cable type antennas 1A, 1B have a configuration in which the energy loss can significantly be suppressed. Furthermore, since the radiation part 10 can clearly be specified by disposing the balun 8A as the radiation region setting part, the electrical length of the antenna line in the radiation part 10 can easily be set to an integral multiple, preferably an even multiple, of λ/2 in this configuration. As described above, the coaxial cable type antennas 1A, 1B of the second embodiment are highly-reliable antenna devices having a configuration that is easy to design and exhibiting stable communication characteristics with less reflection loss than previously known configurations.

Third Embodiment

Figure 8:
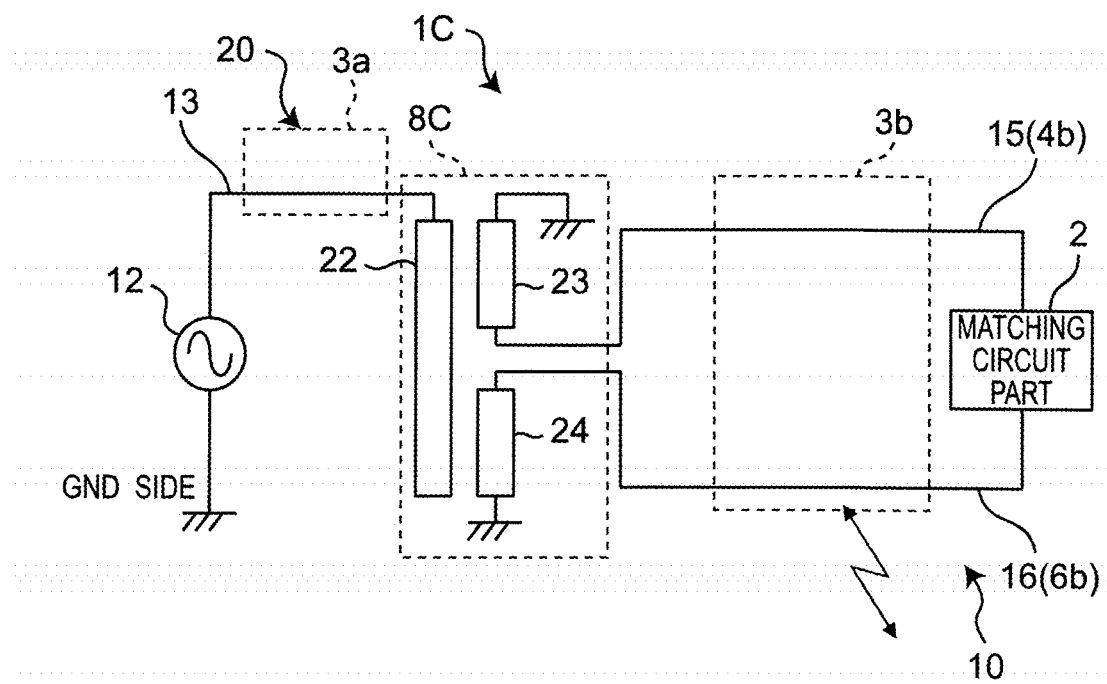
FIG. 8 is an equivalent circuit diagram of a balun in a cable type antenna of a third embodiment according to the present disclosure.

A coaxial cable type antenna 1C will be described as a cable type antenna of a third embodiment according to the present disclosure with reference to the accompanying figure, FIG. 8. In FIG. 8, elements having substantially the same functions and configurations as the first and second embodiments described above are denoted by the same reference numerals. The basic operation of the antenna in the second embodiment is the same as the basic operation in the first embodiment. The third embodiment mainly focuses on describing the differentiating features and aspects.

As with the coaxial cable type antenna 1 of the first embodiment described above, the coaxial cable type antenna 1C of the third embodiment has a configuration in which a balun 8C is disposed as the radiation region setting part.

The coaxial cable type antenna 1C of the third embodiment is different from the coaxial cable type antenna 1 of the first embodiment described above in that the balun 8C serving as the radiation region setting part has a merchant type configuration and has the other configurations substantially the same as the first embodiment. The merchant type balun 8C has two balanced transmission lines disposed via a dielectric such that the same electromagnetic field coupling occurs for one unbalanced transmission line. FIG. 8 is an equivalent circuit diagram showing a configuration of the merchant type balun 8C disposed in the coaxial cable type antenna 1C of the third embodiment.

As shown in FIG. 8, the balun 8C in the coaxial cable type antenna 1C of the third embodiment is made up of a conductor pattern having a first strip conductor 22 connected to the signal transmission line 13 (the signal transmission-side cable 3a) from the power feeding circuit 12, a second strip conductor 23 connected to the high-side (hot-side) line 15 in the antenna line (the radiation-side cable 3b), and a third strip conductor 24 connected to the low-side (cold-side) line 16 (specifically 16b) in the antenna line. The balun 8C has configuration in which the first strip conductor 22 and the second strip conductor 23 are coupled through an electromagnetic field while the first strip conductor 22 and the third strip conductor 24 are coupled through an electromagnetic field in the same way. In the balun 8C in the third embodiment, the signal transmission-side cable 3a is connected to the unbalanced-side terminal, and the radiation-side cable 3b is connected to the balanced-side terminal.

As described above, in the coaxial cable type antenna 1C of the third embodiment, the radiation part 10 and the non-radiation part 20 can clearly be defined by disposing the balun 8C as the radiating region setting part. Therefore, the coaxial cable type antenna 1C of the third embodiment has a configuration in which the antenna line defined as the radiation part 10 can be specified. This configuration also permits the setting of the electrical length of the antenna line (the antenna length) to an integral multiple, preferably an even multiple, of ½ of the wavelength (λ) of the resonance frequency. Additionally, as compared to the configuration in which the leakage signal is attenuated by using a magnetic member for specifying the radiation part, the coaxial cable type antenna 1C of the third embodiment has configuration in which the balun 8C is disposed to prevent leakage to the power feeding circuit side so that the signal is reflected by the radiation part 10. Therefore, the coaxial cable type antenna 1C has a configuration in which the energy loss can significantly be suppressed. As described above, the coaxial cable type antenna 1C of the third embodiment is a highly-reliable antenna device having a configuration that is easy to design and exhibiting stable communication characteristics with less reflection loss than previously known configurations.

The cable type antenna according to the present disclosure configured as described above is an antenna utilizing a standing wave generated in an outer conductor and is not a so-called loop antenna. Additionally, the cable type antenna according to the present disclosure has a configuration in which a communication area is limited to a narrow region within about 1 meter in the vicinity of the radiation part of the cable type antenna. Furthermore, the cable type antenna according to the present disclosure has a configuration in which frequency characteristic are not significantly changed even if a metal body or a magnetic body is present near the antenna line (the radiation-side cable 3b). Additionally, even if the radiation-side cable of the radiation part is physically bent, no interference occurs between bent portions, and therefore, when the cable type antenna according to the present disclosure is used for product management, a display space of products can freely be formed two-dimensionally or three-dimensionally.

APPLICATION EXAMPLES

Description will hereinafter be made of various specific application examples (including usage examples) of the cable type antenna of the present disclosure as described above in the first to third embodiments. The application examples (including usage examples) described below are merely examples and do not limit the present disclosure. The drawings of the application examples (including usage examples) use the configuration of the first embodiment in which the cable type antenna according to the present disclosure is denoted by reference numeral 1 for description; however, the coaxial cable type antennas 1A, 1B, 1C of the other embodiments are obviously also applicable.

Tray with Antenna

Figure 9A:
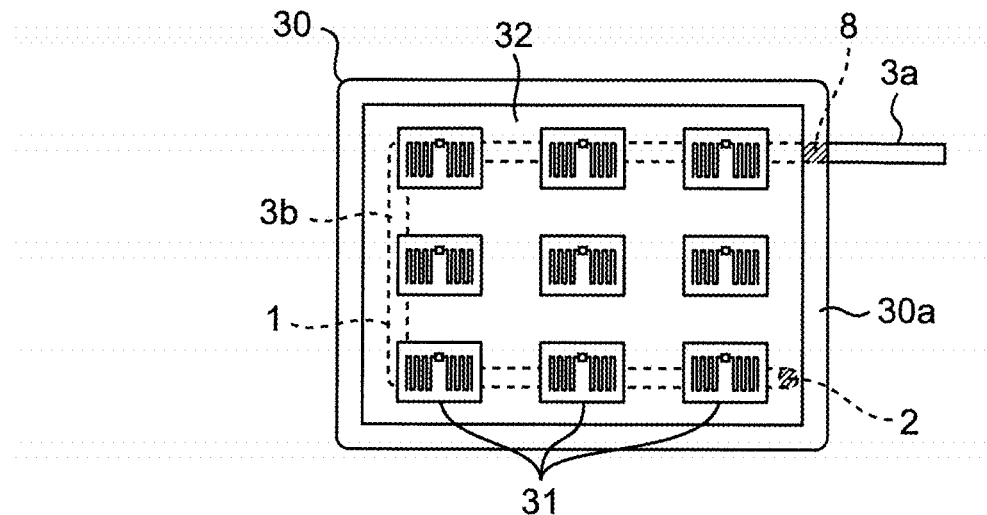
FIG. 9A is a diagram showing an example in which the cable type antenna is disposed in a tray with an antenna.
Figure 9B:
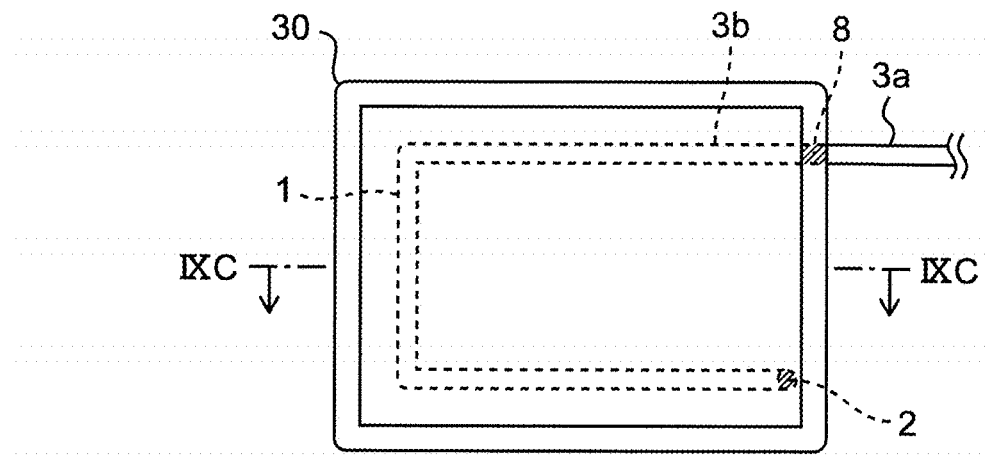
FIG. 9B is a bottom view of the tray with an antenna shown in FIG. 9A.
Figure 9C:
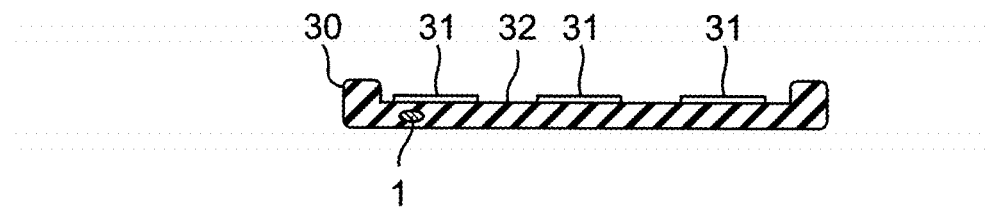
FIG. 9C is a cross-sectional view of the tray with an antenna shown in FIG. 9B cut along a line IXC-IXC and viewed in a direction C.

First, an example of using the cable type antenna 1 according to the present disclosure for a tray 30 with an antenna will be described. FIGS. 9A to 9C are diagrams showing an example in which the cable type antenna 1 is disposed in the tray 30 with an antenna. FIG. 9A is a plan view showing a state in which multiple products 31 with RFID tags are arranged on a placement surface 32 of the tray 30 with an antenna. FIG. 9B is a bottom view of the tray 30 with an antenna shown in FIG. 9A, and FIG. 9C is a cross-sectional view of the tray 30 with an antenna shown in FIG. 9B cut along a line IXC-IXC and viewed in a direction C.

The tray 30 with an antenna is a flat plate member having the placement surface 32 on which the articles 31 with RFID tags are placed. The tray 30 can be any tray commonly used as a tray for placing articles such as a tray made of resin, wood, glass, or the like, excluding metal that is a conductor. The placement surface 32 may have any shape as long as the articles 31 with RFID tags can be arranged. The placement surface 32 also may not necessarily be a flat surface, and may be a curved surface. The placement surface 32 may have a shape with irregularities for holding the articles 31 with RFID tags. The tray 30 may have a portable configuration or a stationary configuration.

In the tray 30 with an antenna, the cable type antenna 1 is disposed immediately under the placement surface 32 on which the multiple articles 31 with RFID tags are arranged. The tray 30 has the balun 8 disposed at an edge portion 30a of the tray as the radiation region setting part having a function of sectionalizing the signal transmission-side cable 3a defined as the first region of the cable type antenna 1 and the radiation-side cable 3b defined as the second region. The edge portion 30a provided with the balun 8 of the cable type antenna 1 is at a position close to the placement surface 32 of the tray 30, so that the radiation-side cable 3b is disposed only immediately under the placement surface 32 in this configuration.

As shown in FIG. 9A, the radiation-side cable 3b of the cable type antenna 1 is arranged along the placement surface 32 of the tray 30 into, for example, in a U-shape such that the placement surface 32 entirely serves as a radiation surface without generating a null point. The configuration acquired by disposing the radiation-side cable 3b of the cable type antenna 1 on the placement surface 32 in this way hardly minimizes null points where reading/writing to RFIDs cannot be performed on the placement surface 32. Therefore, on the placement surface 32 of the tray 30 with an antenna, it is not necessary to specify a location at which a product is placed. Additionally, in the cable type antenna 1 according to the present disclosure, the antenna length of the radiation-side cable 3b defined as the radiation part 10 is set to a desired length, for example, an integral multiple, preferably an even multiple, of ½ of the wavelength (λ) of the resonance frequency. Therefore, the region of communication by the radiation part 10 is in a stable state, and the communication distance from the placement surface 32 can be ensured in a substantially constant state. In the cable type antenna 1, an electromagnetic field becomes weaker as a distance from the center of the cross section of the radiation-side cable 3b increases, and the communication distance is set short, so that the electromagnetic field is generated in a narrow region around the radiation-side cable 3b in the cable type antenna 1. Consequently, this configuration is configured to avoid the risk of erroneously reading an RFID tag of a product that is not placed on the placement surface 32 of the tray 30 with an antenna.

Rack with Antenna

Figure 10:
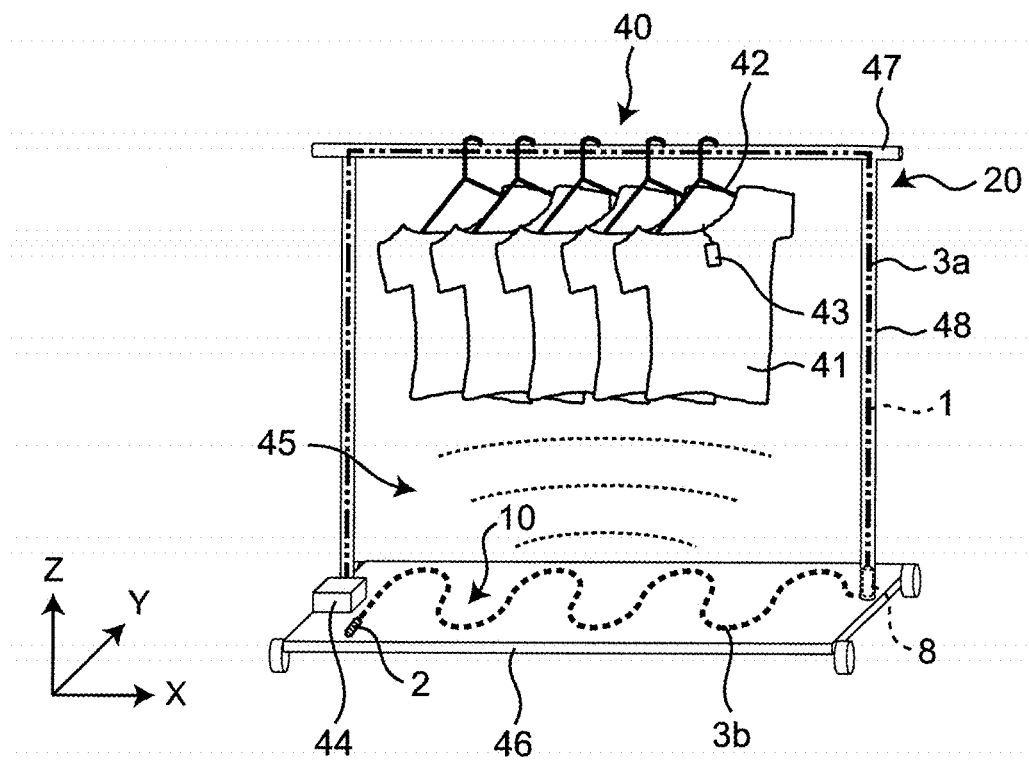
FIG. 10 is a view showing an example in which the cable type antenna is disposed in a rack with an antenna.

An example of using the cable type antenna 1 according to the present disclosure for a rack 40 with an antenna will be described. FIG. 10 is a diagram showing an example in which the cable type antenna 1 is disposed in the rack 40 with an antenna. The rack 40 with an antenna shown in FIG. 10 is a hanger rack that is a product display rack. The rack will hereinafter be described as the hanger rack 40. FIG. 10 shows hangers 42 hanging products 41 on the hanger rack 40. An RFID tag 43 is attached to each of the products 41.

FIG. 10 shows how communication is performed with each of the RFID tags 43 of the multiple products 41 via the radiation-side cable 3b of the second region of the cable type antenna 1. In FIG. 10, for convenience, the X direction is from the left to the right in the horizontal direction of the hanger rack 40, the Y direction is from the front to the back, and the Z direction is from the bottom to the top in the vertical direction.

The cable type antenna 1 is attached to the hanger rack 40, and the radiation-side cable 3b sectionalized by the balun 8 and defined as the radiation part 10 is disposed in a display space 45 in which the products 41 are displayed, or such that the cable faces the display space 45. The hanger rack 40 shown in FIG. 10 has the radiation-side cable 3b disposed on a bottom portion 46 so that the display space 45 is defined as a communication region. On the other hand, the signal transmission-side cable 3a of the first region sectionalized by the balun 8 in the cable type antenna 1 is disposed in a hanger pipe 47 hanging the hangers 42 and support posts 48 such that the display space 45 is separated from at least a portion of an external space. The hanger pipe 47 and the support posts 48 are made of an insulator such as resin and wood, for example. The signal transmission-side cable 3a defined as the non-radiation part 20 of the first region and disposed in this way functions as a shield member.

In the configuration shown in FIG. 10, the radiation-side cable 3b defined as the radiation part 10 is located on a back surface of the bottom portion 46. The balun 8 is located inside a lower end of the support post 48 that is an insulator. The bottom portion 46 is provided with a power feeding circuit 44 of a communication module including an external communication antenna for communicating with a shop-side antenna. The hanger rack 40 shown in FIG. 10 may have casters disposed on the bottom portion 46 and may have a movable configuration.

When the hanger rack 40 configured as described above is used, interference with the cable type antenna of other adjacent hanger racks hardly occurs in this configuration because the cable type antenna 1 has a stable communication region for short-range communication. Additionally, because the non-radiation part 20 of the cable type antenna 1 is used as the shield member separating the display space 45 for displaying products from at least a portion of the external space, the RFID tags of products displayed on adjacent hanger racks are hardly read in this configuration. Consequently, by using the multiple racks with antennas configured as described above, product management can be performed in real time for a large amount of the products 41.

Table with Antenna

Figure 11:
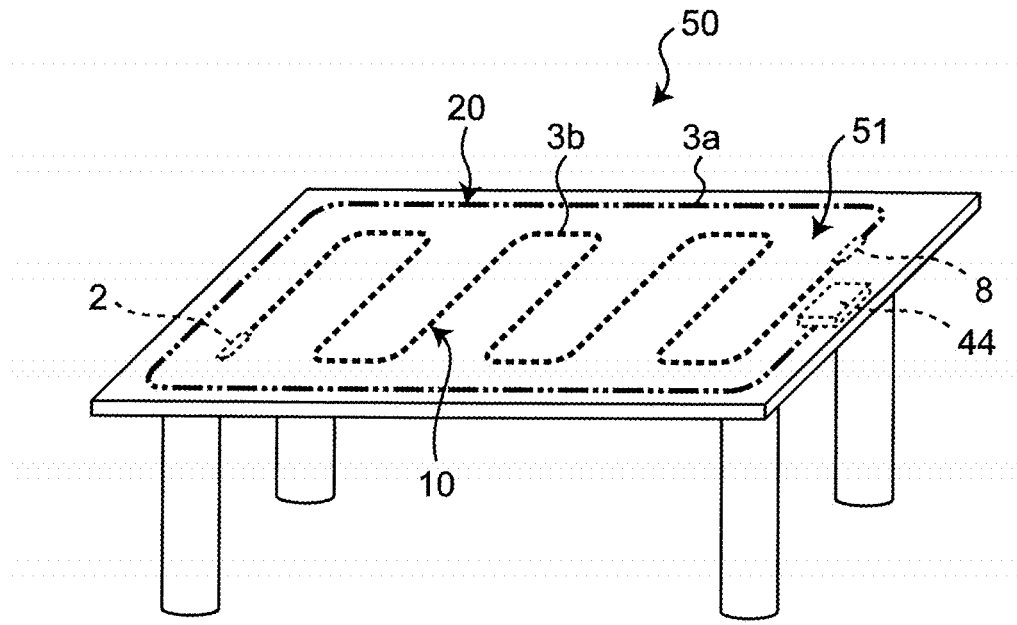
FIG. 11 is a perspective view showing an example in which the cable type antenna is disposed in a table with an antenna.

An example of using the cable type antenna 1 according to the present disclosure for a table with an antenna will be described. FIG. 11 is a perspective view showing an example in which the cable type antenna 1 is disposed in a table 50 with an antenna. The table 50 with an antenna shown in FIG. 11 is a table for product display. The table will hereinafter simply be described as the display table 50.

The display table 50 shown in FIG. 11 has a display region (two-dimensional plane) 51 for displaying products. The radiation-side cable 3b defined as the radiation part 10 in the cable type antenna 1 is two-dimensionally arranged in a meander shape inside the display region 51, though other shapes are contemplated herein. Therefore, the radiation-side cable 3b of the second region sectionalized by the balun 8 is disposed such that the display region (two-dimensional plane) 51 substantially entirely serves as a radiation plane.

On the other hand, the signal transmission-side cable 3a sectionalized by the balun 8 and defined as the non-radiation part 20 in the cable type antenna 1 is disposed to surround the outside of the arrangement region of the radiation-side cable 3b arranged in the meander shape. Therefore, the signal transmission-side cable 3a is disposed on the outer edge side of the display region 51. The signal transmission-side cable 3a disposed in this way functions as a shield member.

As described above, by using the display table 50 including the cable type antenna 1, when multiple products are placed and displayed in the display region 51 that is a two-dimensional plane, the RFID tags added to the products can properly be read.

Basket with Antenna

Figure 12:
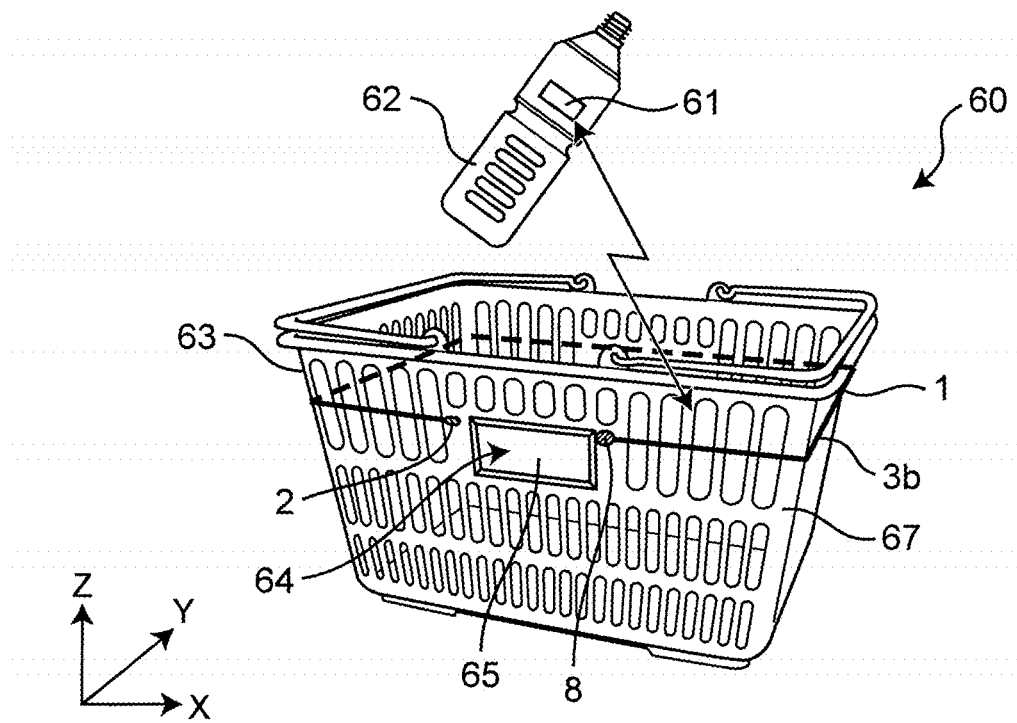
FIG. 12 is a perspective view showing an example in which the cable type antenna is disposed in a basket with an antenna.

An example of using the cable type antenna 1 according to the present disclosure for a basket with an antenna will be described. FIG. 12 is a perspective view showing a configuration of a shopping basket with an antenna 60 that is an example of a basket with an antenna.

The shopping basket 60 with an antenna includes a basket main body 63 receiving a product 62 to which an RFID tag 61 is attached, and a reader/writer module 64 reading the RFID tag 61 attached to the product 62. The reader/writer module 64 includes a power feeding circuit 65 including an RFIC element, and the cable type antenna 1.

As shown in FIG. 12, the cable type antenna 1 is arranged to circle around and surround a body portion 67 on the lower side of an upper opening of the basket main body 63. One end of the cable type antenna 1 is connected to the RFIC element of the power feeding circuit 65, and the other end is disposed on the body portion 67 as a terminal end (a leading end portion).

The cable type antenna 1 is sectionalized by the balun 8 into the signal transmission-side cable of the non-radiation part 20 and the radiation-side cable 3b of the radiation part 10 with matching circuit 2, and the radiation-side cable 3b defined as the radiation part 10 is disposed around the body portion 67 of the basket main body 63. It is not necessary to dispose the radiation-side cable 3b of the radiation part 10 on all the surfaces constituting the body portion 67 of the basket main body 63. The radiation-side cable 3b may be disposed such that at least an internal space of the basket main body 63 serves as a communicable space for the RFID tag 61 and may be disposed on at least a portion of the surfaces constituting the basket main body 63.

The shopping basket 60 with an antenna configured as described above has a configuration in which the reader/writer module 64 including the cable type antenna 1 can communicate with the RFID tag 61 of the product 62 received in the basket main body 63. An RFID system constructed by the reader/writer module 64 and the RFID tag 61 used in this case is a UHF band RFID system using the 900 MHz band as a communication frequency band.

As described above, in the shopping basket 60 with an antenna, the radiation-side cable 3b specified by the balun 8 in the cable type antenna 1 functions as an antenna. The reader/writer module 64 can read the RFID tag 61 of the product 62 received in the basket main body 63.

In the shopping basket 60 with an antenna shown in FIG. 12, the radiation-side cable 3b defined as the radiation part 10 is arranged to circle around and surround the receiving portion of the basket main body 63. When the radiation-side cable 3b is arranged to circle around, radio waves are radiated from the circling radiation-side cable 3b in various directions. Consequently, if the product 62 is arranged in a stacked manner in the basket main body 63 (even if the RFID tag 61 is stacked) it is highly likely that the tag will be read from any of the directions, and the reading accuracy of the RFID tag 61 is improved over known configurations. Additionally, since the radiation-side cable 3b specified by the balun 8 is used, interference does not occur in this configuration even if the antenna is arranged to circle around. Therefore, even if the product 62 or a package thereof contains metal, the tag can be read from a direction not affected by shielding caused by the metal, so that the reading accuracy of the RFID tag 61 attached to the product 62 is not reduced.

Additionally, since the cable type antenna 1 is used, even if another shopping basket or a metal body is present nearby, reading characteristics are prevented from being significantly deteriorated. Furthermore, since no interference occurs between the cable type antennas 1 of the respective shopping baskets 60 in this configuration, a possibility of wrongly reading another product received in the shopping basket 60 present nearby is extremely small in this configuration as compared to previously known configurations.

The reader/writer module 64 constituting the shopping basket 60 with an antenna may further include an antenna and a wireless LAN slave device for communicating with a wireless LAN master device disposed in a store. Furthermore, the reader/writer module 64 may have a configuration including a control unit, a battery, etc.

By using the shopping basket 60 with an antenna, when the product 62 is received in the shopping basket 60, the information thereof is read by the reader/writer module 64, and the read information is transmitted through communication between the wireless LAN slave device and the master device to a host computer on the store side. When the product 62 is received in the shopping basket 60, the information is reflected in a database on the store side, so that stock information can be monitored and updated in real time. At the time of payment for the product 62 in the shopping basket 60, the information of the product 62 in the shopping basket 60 is already retrieved, simplifying and accelerating the payment process.

Conveyance Table with Antenna

Figure 13:
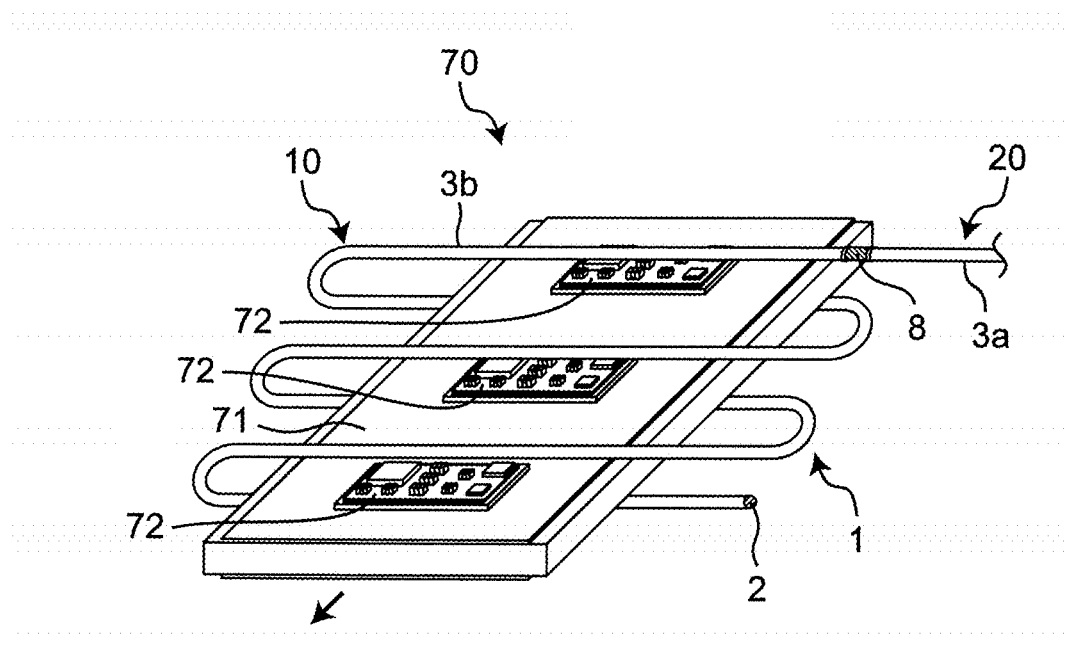
FIG. 13 is a view showing an example in which the cable type antenna is disposed on a conveyance table with an antenna.

An example of disposing the cable type antenna 1 according to the present disclosure on a conveyance table with an antenna will be described. The conveyance table in this case has a configuration including a conveyance belt conveying articles in one direction. FIG. 13 is an example of a conveyance table 70 with an antenna and shows a state in which articles 72 on a conveyance belt 71 move in one direction. An arrow of FIG. 13 indicates the conveying direction. As shown in FIG. 13, the cable type antenna 1 is wound in a helical shape around a conveyance path of the conveyance belt 71. The cable type antenna 1 is wound multiple times along the conveying direction of the conveyance path. The cable type antenna 1 disposed around the conveyance belt 71 in this way is the radiation-side cable 3b serving as the radiation part 10 specified by the balun 8. Therefore, in the cable type antenna 1 extending from the power feeding circuit side, the balun 8 is disposed immediately before a position first reaching the vicinity of the conveying path 71.

In the cable type antenna 1 shown in FIG. 13, the position of the leading end portion of the radiation-side cable 3b provided with the matching circuit 2 is located downstream of the conveyance path in the conveying direction. The position of the leading end portion of the radiation-side cable 3b may be located on the upstream side. The cable type antenna 1 is made up of a coaxial cable, for example, and is therefore easily wound and arranged in a helical shape around the conveyance path as described above.

The conveyance table 70 with an antenna configured as described above is arranged such that the radiation-side cable 3b serving as the radiation part 10 in the cable type antenna 1 certainly crosses the conveyance belt 71 multiple times. Therefore, when the articles 72 having RFID tags attached thereto are conveyed by the conveyance belt 71 and pass through the radiation-side cable 3b, information of the RFID tags of the articles 72 being conveyed is reliably read on the conveyance table 70.

Figure 14:
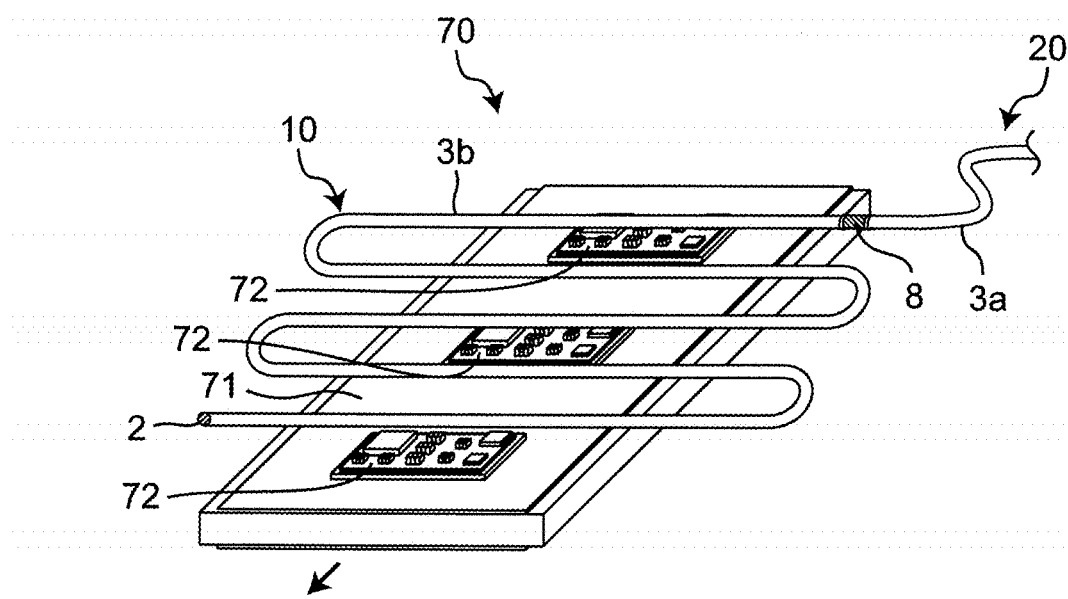
FIG. 14 is a view showing a modification in which the cable type antenna is disposed on a conveyance table with an antenna.

FIG. 14 is a diagram showing a modification of the conveyance table 70 with an antenna. The conveyance table 70 with an antenna shown in FIG. 14 is arranged in a meander shape such that the radiation-side cable 3b serving as the radiation part 10 in the cable type antenna 1 meanders above the articles 72 being conveyed. The radiation-side cable 3b serving as the radiation part 10 may be arranged to come closer gradually (continuously or stepwise) to the articles 72 toward the leading end side or the power feeding circuit side in a manner corresponding to various articles.

By configuring the conveyance table 70 with an antenna as described above, the RFID system can be constructed with the RFID tags of the articles 72 conveyed on the conveyance belt 71, and the reading and/or writing process can be performed with higher accuracy than in previously known configurations.

Cable Configuration Example

Figure 15:
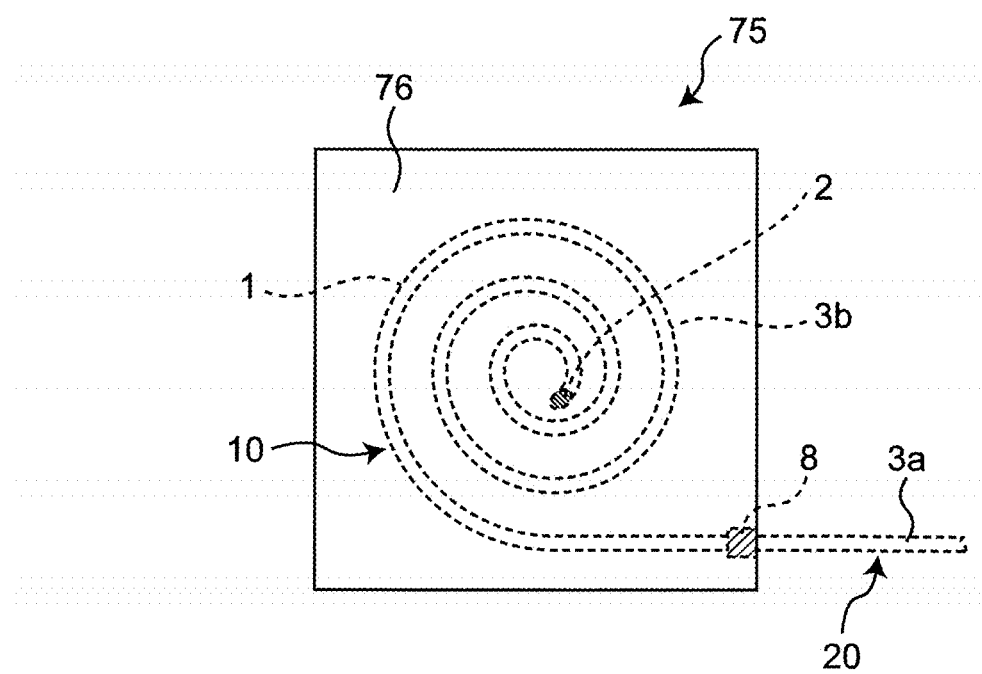
FIG. 15 is a plan view showing an example in which the cable type antenna is disposed on a flatbed with an antenna.

A configuration example using the cable type antenna 1 according to the present disclosure will be described. FIG. 15 is a plan view showing a flatbed 75 with antenna having the cable type antenna 1 disposed inside the flatbed 75 having a flat surface 76. The flatbed 75 with antenna is made of an insulator such as resin and wood, for example, and the cable type antenna 1 is disposed immediately under the flat surface 76. In the cable type antenna 1, the radiation-side cable 3b serving as the radiation part 10 is disposed in a spiral shape immediately under the flat surface 76 such that a communication space is formed above the flat surface 76. In the cable type antenna 1, the balun 8 is disposed at an edge portion of the flat surface 76, sectionalizing the radiation-side cable 3b serving as the radiation part 10 and the signal transmission-side cable 3a serving as the non-radiation part 20 connected to the power feeding circuit. The matching circuit 2 is at the terminal position of the radiation-side cable 3b in a spiral shape and is disposed substantially immediately under the center of the flat surface 76.

As described above, the flatbed 75 with antenna has the radiation-side cable 3b two-dimensionally arranged in a spiral shape for substantially the entire flat surface 76, and therefore, substantially the entire flat surface 76 of the flatbed 75 serves as a communicable region.

Cable Coupling Example

Figure 16A:
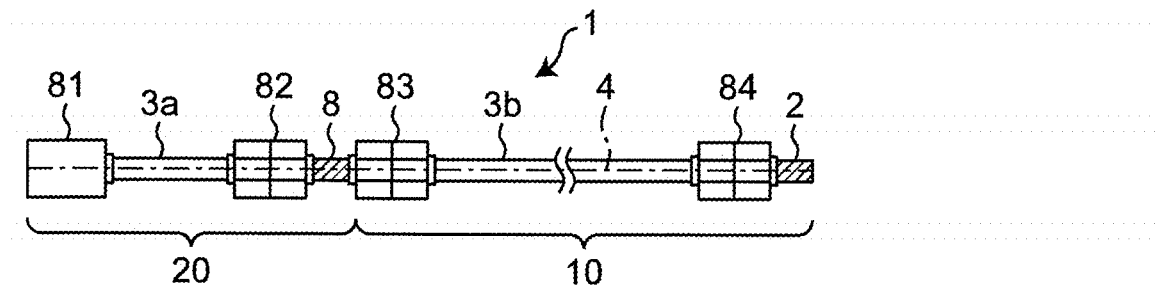
FIG. 16A is a diagram showing a configuration example of the cable type antenna according to the present disclosure.
Figure 16B:
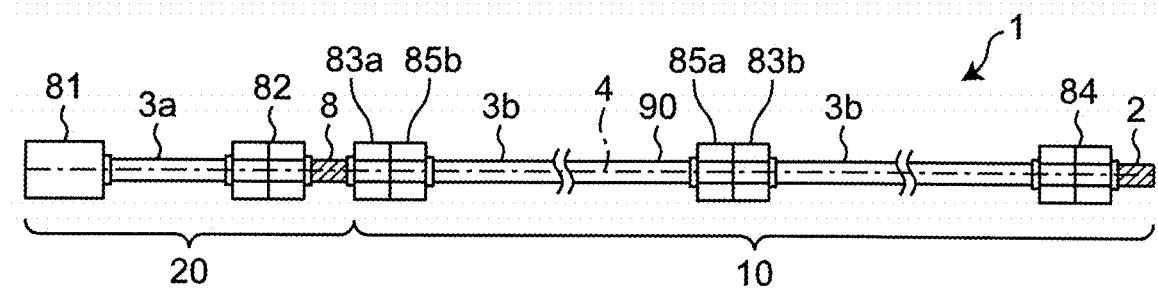
FIG. 16B is a diagram showing a configuration in which an extension cable is connected to the cable type antenna of FIG. 16A.
Figure 16C:
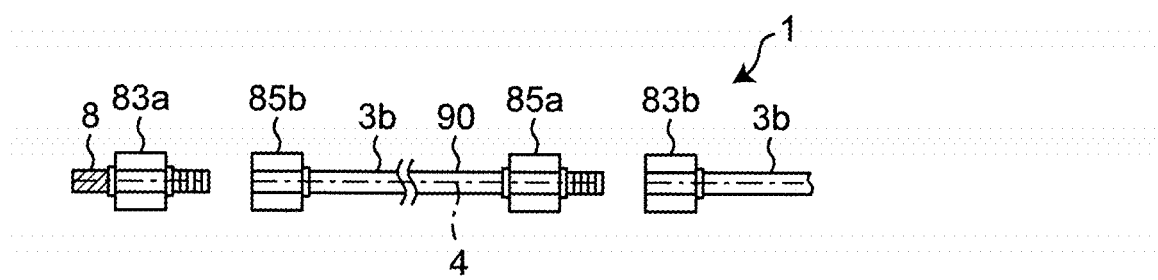
FIG. 16C is a diagram showing a state immediately before connecting the extension cable in the configuration example of the cable type antenna according to the present disclosure.
Figure 16D:
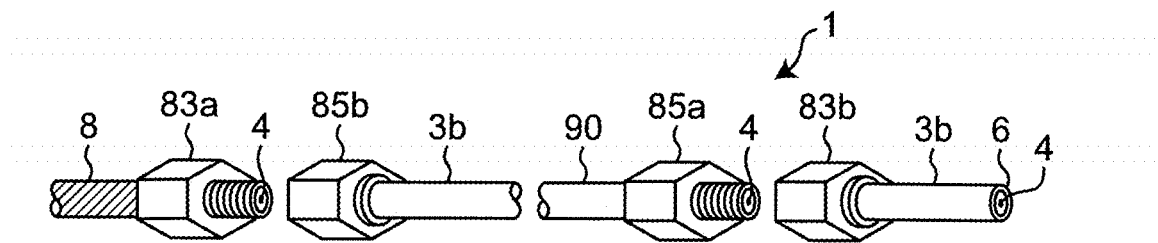
FIG. 16D is a perspective view of the extension cable shown in FIG. 16C.

FIG. 16A is a diagram showing the coaxial cable type antenna 1 according to the present disclosure and shows a state of the matching circuit 2, the coaxial cables 3 (3a, 3b), and the balun 8 that is a balanced-to-unbalanced transformer element connected via a plurality of connectors 81, 82, 83, 84. FIG. 16B is a diagram showing a configuration in which an extension cable 90 including connectors 85a, 85b at both ends is connected to the cable type antenna 1 shown in FIG. 16A to extend the antenna length of the radiation part 10 of the cable type antenna 1. FIG. 16C is a diagram showing a state immediately before connecting the extension cable 90 that is the coaxial cable 3 including the connectors 85a, 85b at both ends. FIG. 16D is a perspective view of the extension cable 90 shown in FIG. 16C. The coaxial cables 3 (3a, 3b, 90) shown in FIGS. 16A to 16D have the same configuration as the coaxial cable 3 shown in FIG. 2 and have the inner conductor 4 and the outer conductor 6.

As shown in FIGS. 16B to 16D, the coaxial cable type antenna 1 can have the radiation part 10 extended by connecting the extension cable 90 including the connectors 85a, 85b at both ends to the radiation-side cable 3b that is the radiation part 10. The connector 85a of the extension cable 90 is a plug A having the same configuration as a connector 83a to which the balun 8 is connected. On the other hand, the connector 85b of the extension cable 90 is a plug B having the same configuration as a connector 83b to which the radiation-side cable 3b is connected. As with the other connectors (81, 82, 83, 84), the connectors 85 (85a, 85b) of the extension cable 90 are a pair of plugs screwed to electrically directly connect the plug A and the plug B.

As described above, by connecting the extension cable 90 including the connectors 85a (plug A), 85b (plug B) at both ends to the radiation-side cable 3b of the radiation part 10, the radiation part 10 can be extended to a desired length. By using the extension cable 90 in this way, the length of the radiation part 10 can appropriately be set in consideration of the communication region using the RFID system.

In the above description, the extension cable 90 is connected to the radiation part 10 in the described configuration, however, the extension cable 90 can also be connected to the non-radiation part 20. In this case, the connectors disposed at both ends of the extension cable 90 are appropriately selected and used such that the connectors are compatible with connectors used for the signal transmission-side cable 3a serving as the non-radiation part 20. By unifying the types of connectors used in the coaxial cable type antenna 1, the radiation part 10 and/or the non-radiation part 20 can be changed to a desired length with an extension cable having the same configuration. Therefore, with the coaxial cable type antenna 1 including the extension cable 90, the communication region can easily be changed to a desired region depending on a use thereof.

The various embodiments of cable type antenna described in the present disclosure have a small-sized lightweight configuration in which a communication region can be specified to a desired region and is therefore useful particularly as an antenna of a reader/writer device, and the like, in an RFID system.

In the embodiments and application examples described above, the cable type antenna has been described in terms of the coaxial cable type antenna using a 50Ω coaxial cable, however, the present disclosure is not limited to this configuration and is applicable to an antenna of a high-frequency transmission line using a stripline/microstrip line etc.

As described above with the configuration examples of the plurality of embodiments, the cable type antenna of the present disclosure has a small-sized, lightweight, and simple configuration, has a communication region having a desired antenna length, and can provide a cable type antenna with excellent communication characteristics. Additionally, by applying the cable type antenna producing such excellent effects to various devices, devices having desired communication characteristics can be provided.

The present disclosure includes appropriately combining arbitrary embodiments and/or modifications out of the various embodiments and/or modifications described above, and combinations configured in this way can produce the effects of the respective embodiments and/or modifications.

EXPLANATIONS OF LETTERS OR NUMERALS 1 coaxial cable type antenna
2 matching circuit
3 coaxial cable
3a signal transmission-side cable (first region)
3b radiation-side cable (second region)
4 inner conductor
4a inner conductor of signal transmission-side cable
4b inner conductor of radiation-side cable
5 insulator
6 outer conductor
6a outer conductor of signal transmission-side cable
6b outer conductor of radiation-side cable
8 balun (balanced-to-unbalanced transformer element)
10 radiation part
12 power feeding circuit
13 signal transmission line
15 high-side (hot-side) line
16 low-side (cold-side) line
17 cable matching circuit
20 non-radiation part
30 tray with antenna
40 rack with antenna
50 table with antenna (display table)
60 basket with antenna
70 conveyance table with antenna
90 extension cable

The invention claimed is:

1. A cable type antenna comprising:
   a first conductor including a first end connected to a power feeding circuit and a second other end configured as a leading end, the cable type antenna being sectionalized into a first region on the power feeding circuit side and a second region on the leading end side;
   a second conductor disposed along the first conductor;
   a matching circuit disposed between the leading end of the first conductor and a leading end of the second conductor;
   a cable matching circuit disposed between the first region and the second region and configured to match impedances of the first region and the second region; and
   a balanced-to-unbalanced transformer element disposed between the first region and the second region,
   wherein, the balanced-to-unbalanced transformer element includes an unbalanced-side terminal connected to the first region and a balanced-side terminal connected to the second region, such that the first region is configured as a non-radiation part and the second region is configured as a radiation part.

2. The cable type antenna according to claim 1, wherein the balanced-to-unbalanced transformer element is disposed at a position where the antenna length in the second region is an integral multiple of ½ of a wavelength of a resonance frequency of the cable type antenna.

3. The cable type antenna according to claim 2, wherein the matching circuit is configured to match impedances of the first conductor and the second conductor in the second region and to form the resonance frequency of the second region.

4. The cable type antenna according to claim 1, wherein the balanced-to-unbalanced transformer element is disposed at a position where the antenna length of the second region is an even multiple of ½ of a wavelength of a resonance frequency of the cable type antenna.

5. The cable type antenna according to claim 1, wherein the cable type antenna comprises a coaxial cable that includes an inner conductor as the first conductor and an outer conductor as the second conductor.

6. The cable type antenna according to claim 1, wherein the balanced-to-unbalanced transformer element is configured as one of a winding transformer type, a merchant type, or a lumped parameter type.

7. The cable type antenna according to claim 1, wherein the balanced-to-unbalanced transformer element comprises:
   a first inductor connecting a signal transmission line from the power feeding circuit side and a high-side line of the radiation part;
   a first capacitor coupled to a high side of the first inductor and ground;
   a second capacitor connecting the signal transmission line to a low side of the radiation part; and
   a second inductor having a first end connected to a low side line of the second capacitor and a second end connected to ground.

8. The cable type antenna according to claim 7, wherein a signal transmission-side of the signal transmission line is connected to the unbalanced-side terminal, and the radiation part is connected to the balanced-side terminal.

9. A tray for placement of products with RFID tags, comprising:
a placement surface configured to place at least one product having an RFID tags attached thereto; and
a cable type antenna disposed underneath the placement surface, the cable type antenna comprising:
a first conductor including a first end connected to a power feeding circuit and a second end configured as a leading end, the cable type antenna being sectionalized into a first region on a side of the power feeding circuit and a second region on a side of the leading end;
a second conductor disposed along the first conductor;
a matching circuit disposed between the leading end of the first conductor and a leading end of the second conductor;
a balanced-to-unbalanced transformer element disposed between the first region and the second region, the balanced-to-unbalanced transformer element including an unbalanced-side terminal connected to the first region and a balanced-side terminal connected to the second region, such that the first region is configured as a non-radiation part and the second region is configured as a radiation part; and
a cable matching circuit disposed between the first region and the second region and configured to match impedances of the first and second regions,
wherein the balanced-to-unbalanced transformer element is disposed at an edge of the tray with the radiation part sectionalized under the placement surface.

10. The tray for placement of claim 9, wherein the placement surface comprises of resin, wood or glass.

11. The tray according to claim 10, wherein the matching circuit is configured to match impedances of the first conductor and the second conductor in the second region and to form the resonance frequency of the second region.

12. The tray according to claim 9, wherein the balanced-to-unbalanced transformer element is disposed at a position where the antenna length in the second region is an integral multiple of ½ of a wavelength of a resonance frequency of the cable type antenna.

13. The tray according to claim 9, wherein the balanced-to-unbalanced transformer element is disposed at a position where the antenna length of the second region is an even multiple of ½ of a wavelength of a resonance frequency of the cable type antenna.

14. The tray according to claim 9, wherein the cable type antenna comprises a coaxial cable that includes an inner conductor as the first conductor and an outer conductor as the second conductor.

15. The tray according to claim 9, wherein the balanced-to-unbalanced transformer element is configured as one of a winding transformer type, a merchant type, or a lumped parameter type.

16. A conveyance table comprising:
a conveyer belt including a placement surface for placing at least one product with RFID tag attached thereto, wherein the conveyer belt is configured to move the at least one product in a first direction; and
a cable type antenna disposed around the conveyer belt and configured to read the RFID tag as the at least one product moves in the first direction, the cable type antenna comprising:
a first conductor including a first end connected to a power feeding circuit and a second end configured as a leading end, the cable type antenna being sectionalized into a first region on a side of the power feeding circuit and a second region on a side of the leading end;
a second conductor disposed along the first conductor;
a matching circuit disposed between the leading end of the first conductor and a leading end of the second conductor;
a balanced-to-unbalanced transformer element disposed between the first region and the second region, the balanced-to-unbalanced transformer element including an unbalanced-side terminal connected to the first region and a balanced-side terminal connected to the second region, such that the first region is configured as a non-radiation part and the second region is configured as a radiation part
a cable matching circuit disposed between the first region and the second region and configured to match impedances of the first and second regions,
wherein the balanced-to-unbalanced transformer element is disposed at an edge of the conveyer belt with the radiation part sectionalized over the placement surface.

17. The conveyance table of claim 16, wherein the cable type antenna is wound in a meandering shape disposed above the placement surface.

18. The cable type antenna according to claim 16, wherein the cable type antenna comprises a coaxial cable the includes an inner conductor as the first conductor and an outer conductor as the second conductor.

* * * * *